United States Patent [19]

Wellman

[11] Patent Number: 4,793,249

[45] Date of Patent: Dec. 27, 1988

[54] DOUBLE TWINE ARM FOR DISPENSING TWINE INTO A BALE CHAMBER

[75] Inventor: Stanley P. Wellman, Ottumwa, Iowa

[73] Assignee: Deere & Company, Moline, Ill.

[21] Appl. No.: 56,083

[22] Filed: Jun. 1, 1987

[51] Int. Cl.$^4$ .................. B65B 13/18; A01D 39/00
[52] U.S. Cl. ........................................ 100/13; 100/5; 100/88; 56/341; 53/176; 53/587
[58] Field of Search ............... 100/5, 13, 88; 56/341, 56/343; 53/211, 587, 389, 176, 118

[56] References Cited

U.S. PATENT DOCUMENTS

| | | | |
|---|---|---|---|
| 2,893,189 | 7/1959 | Lancaster | 53/389 X |
| 2,971,455 | 2/1961 | Wade et al. | 100/13 X |
| 4,158,331 | 6/1979 | Campbell et al. | 100/5 |
| 4,167,844 | 9/1979 | Freimuth et al. | 100/5 |
| 4,253,389 | 3/1981 | Campbell et al. | 100/5 |
| 4,446,783 | 5/1984 | Illy | 100/5 |
| 4,457,226 | 7/1984 | Meiers | 100/5 |
| 4,557,189 | 12/1985 | Schaible | 100/13 X |
| 4,649,812 | 3/1987 | Mounet | 100/13 X |

FOREIGN PATENT DOCUMENTS 1261581 10/1986 U.S.S.R. ................ 100/5

Primary Examiner—Andrew M. Falik

[57] ABSTRACT

A twine dispensing mechanism for feeding twine into the bale chamber of a large round baler includes a double twine arm assembly comprising a first twine arm driven for sweeping its twine dispensing end across the front of the bale chamber and a second twine arm pivotally mounted to the first twine arm and having a twine dispensing end which may be selectively spaced from the end of the first arm by an adjustable spring biased bar assembly.

10 Claims, 5 Drawing Sheets

DOUBLE TWINE ARM FOR DISPENSING TWINE INTO A BALE CHAMBER

BACKGROUND OF THE INVENTION

The present invention relates to twine dispensing mechanisms for wrapping bales, formed in the chambers of large round balers, with twine and more specifically relates to double twine arm arrangements for introducing twine into the chambers of such balers.

U.S. Pat. No. 4,457,226 granted to Meiers on July 3, 1984 shows an automatically actuated and controlled twine wrapping mechanism which employs a single twine arm driven by gearing oscillated by an extensible and retractable hydraulic actuator to cycle a twine dispensing end of the twine arm between opposite sidewalls of the bale forming chamber for causing a bale to be wrapped with spiral wraps of twine. The baler must be stopped during the time a bale is being wrapped and consequently it is desirable to shorten the time required for wrapping the bale. The cycle speed of the arm may be adjusted; however, this also adjusts the number of wraps or wrap spacing of twine applied to the bale and such adjustment may not be desirable.

Twine wrapping mechanisms employing pairs of gear-driven, twine dispensing arms have been developed for shortening twine wrapping cycle time. These developments are exemplified by the mechanisms disclosed in U.S. Pat. Nos. 4,158,331 issued June 19, 1979; 4,167,844 issued Sept. 18, 1979 and 4,253,389 issued Mar. 3, 1981. One problem with these designs is that they are not applicable for use with balers having relatively narrow bale chambers since a dispensing arm must be relatively long in order for its dispensing end to sweep a relatively shallow arc when dispensing and the space availability for mounting two arms without interfering with one another and with other structure is lacking on a narrow baler. Further, no way is provided for adjusting the spacing between wraps other than by adjusting the cycle speed of the arms.

U.S. Pat. No. 4,446,783 issued May 8, 1984 discloses a twine arm assembly which overcomes the space problem, associated with the patented devices discussed in the immediately preceding paragraph, by mounting two dispenser tubes on a single support arm. However, this assembly still does not provide means for adjusting the spacing of wraps of twine on the bale without modifying the cycle speed of the arm.

SUMMARY OF THE INVENTION

According to the present invention there is provided a double twine arm assembly which represents an improvement over that disclosed in the above-described U.S. Pat. No. 4,446,783.

A broad object of the invention is to provide a double twine arm adaptable for use with relatively narrow-chambered large round balers and being operable for changing the spacing between adjacent wraps of twine on the bale without changing the cycle speed of the arms.

A more specific object is to provide a double twine arm wherein a first arm is mounted for oscillating about an upright axis and a second arm is connected to the first arm for swinging therewith by connection means which makes it possible to adjust the spacing between twine dispensing ends of the arms to thereby adjust the spacing of the twine wraps applied to a bale being wrapped.

Yet another object is to provide a double twine arm wherein drive means is coupled to a first twine arm for pivoting it about a first axis and a second twine arm is pivotally mounted to the first arm and adjustably resiliently held in a desired position relative to the first arm to thereby dispose twine dispensing end of the second arm a preselected distance from the twine dispensing end of the first arm.

These and other objects, features and advantages of the present invention will become apparent to those skilled in the art from the description which follows and from the drawings.

DESCRIPTION OF THE PREFERRED EMBODIMENT

Figure 1:
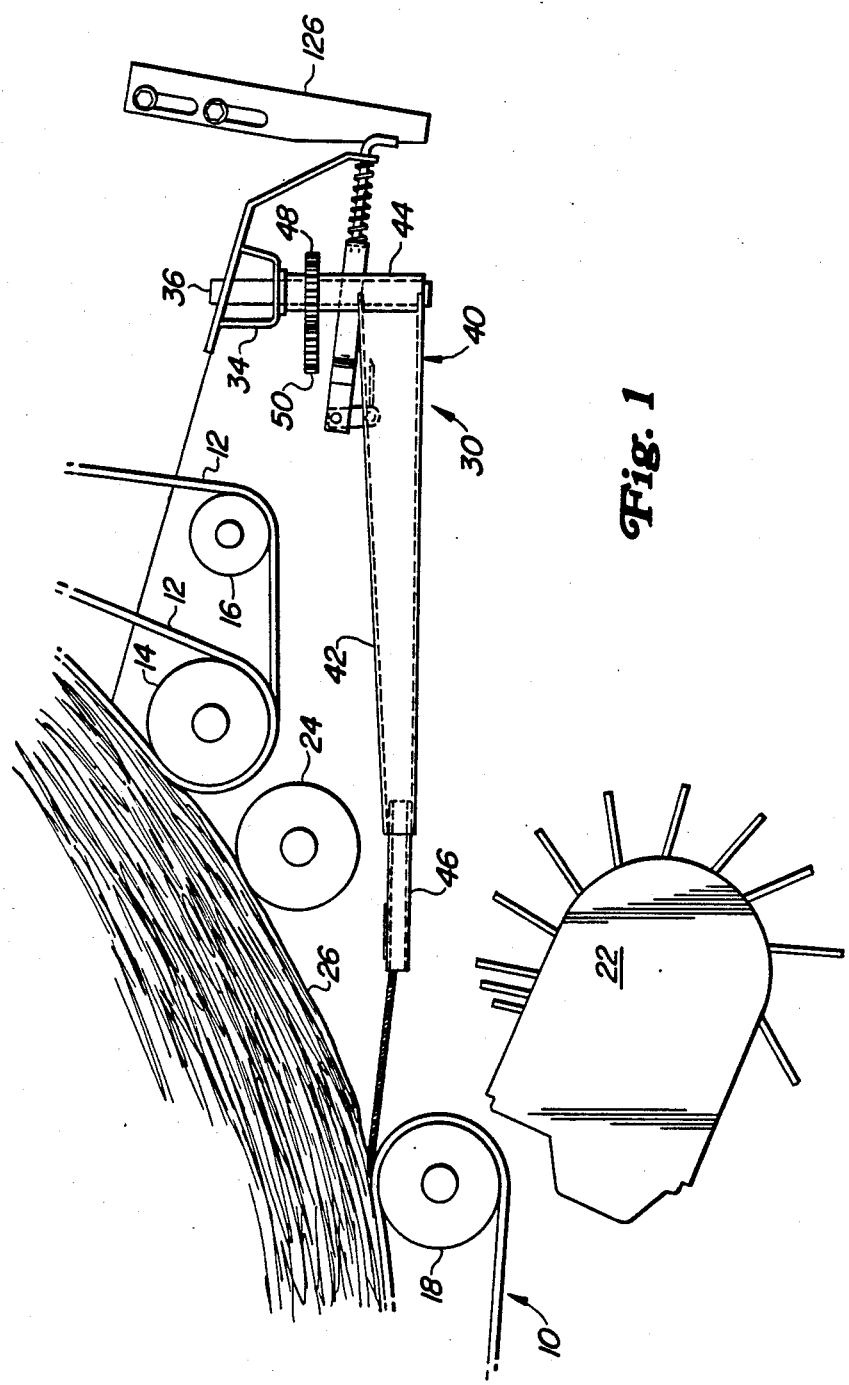
FIG. 1 is a schematic, right side elevational view showing the double twine arm assembly in a rearwardly extending position dispensing twine into the bale forming chamber and showing a portion of the twine cut-off mechanism.

Referring now to FIG. 1, there is shown a lower forward region of a bale forming chamber 10 of a baler for making large cylindrical bales. The chamber 10 is of an expansible type delimited by a plurality of belts supported side-by-side on a plurality of rolls extending between a pair of sidewalls forming opposite ends of the chamber and in which the ends of some of the rolls are rotatably mounted with others of the rolls having their opposite ends rotatably mounted in take-up or tensioning arms vertically swingably mounted to the sidewalls. Such an expansible bale chamber is disclosed in detail in U.S. Pat. No. 4,428,282 issued on Jan. 31, 1984.

That portion of the chamber 10 illustrated in FIG. 1 includes a plurality of belts 12 supported in side-by-side relationship across a driven roll 14, a roll 16 located ahead of the roll 14 and about which only selected ones of the belts 12 are trained so as to define a staggered array, and a bottom roll 18 which cooperates with the driven roll 14 to delimit a chamber inlet through which crop is fed by a pickup 22. A driven starter roll 24 is located in the inlet for cooperating with the belts 12 for initiating the rolling up of crop to form a bale core about which crop is thereafter rolled upon to form a complete bale 26, as shown.

Figure 2:
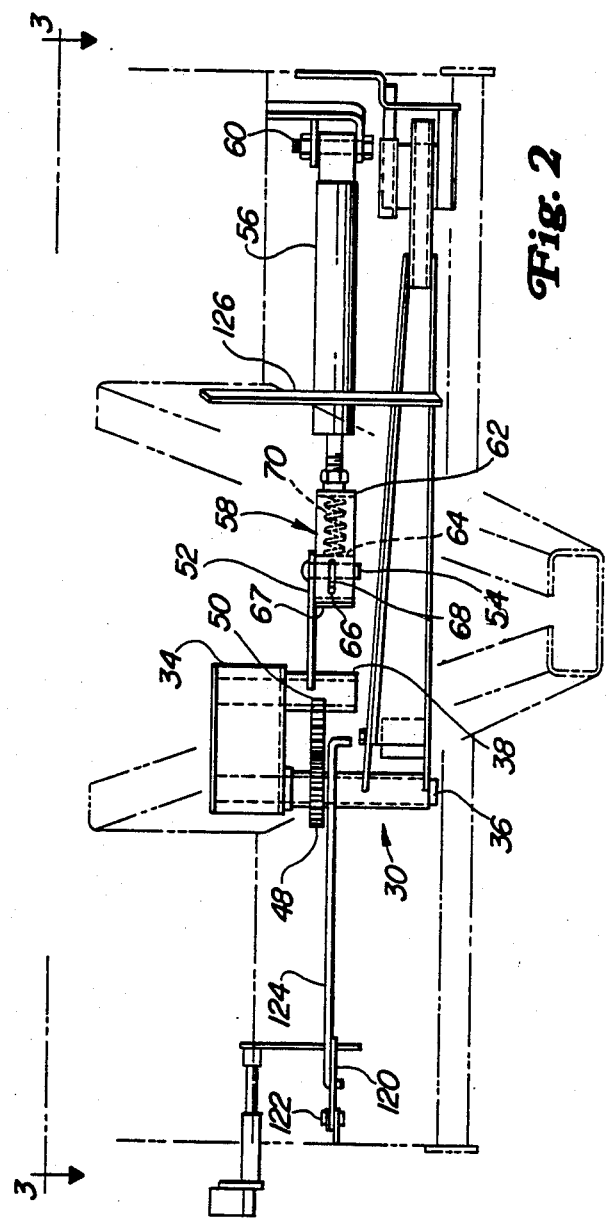
FIG. 2 is a front elevational view of the double twine assembly showing the double twine arm in a first location from which it moves and to which it returns during a bale wrapping cycle.

A double twine arm assembly 30 is shown mounted to a cross beam (not shown) located forwardly of the bale forming chamber 10. Specifically, referring now also to FIGS. 2–4 and considering the structure as viewed facing in the forward direction of travel, the double twine arm assembly 30 includes a twine arm support 34 fixed to the underside of the cross beam at a location rightwardly of the fore-and-aft center line of the baler, and including right- and left-hand, upright support shafts 36 and 38, respectively, fixed in depending relationship to the beam. A first twine arm 40 is formed of a channel-like main section 42 having an outwardly decreasing taper and having an upright tubular mounting member 44 fixed to an inner end thereof and having a generally horizontal twine dispensing tube 46 fixed to an outer end thereof. A driven gear 48 has a hub welded to an upper end of the member 44 and the member 44 and gear 48 are mounted for oscillation about the right-hand support shaft 36. A drive gear 50 in the form of a toothed, semicircular segment has a hub mounted for oscillation about the left-hand support shaft 38. A crank arm 52 projects radially from the hub and carries an upright pin 54 at its outer end. An extensible and retractable hydraulic actuator 56 has its rod end connected to the pin 54 through means of a resiliently extensible link 58 and has its cylinder end coupled to the baler frame by a pivot pin 60. The link 58 includes a U-shaped member 62 having its bight portion threadedly received on a threaded end of the rod end of actuator 56. A swivel block 64 is pivotally received on the pin 54 and carries a cross pin 66 having opposite ends slidably received in elongate slots 68 provided in Opposite legs of the U-shaped member 62. A compression spring 70 is compressed between the bight portion of the member 62 and the block 64 and normally maintains the pin 54 adjacent the ends of the slots 66 remote from the bight portion with the block being against a plate 67 joining the ends of the legs of the member 62. Thus, it will be appreciated that the link 58 will permit further extension of the actuator 56 upon engagement of the crank arm 52 with a stop 72, the purpose of this feature being described in more detail below.

Figure 6:
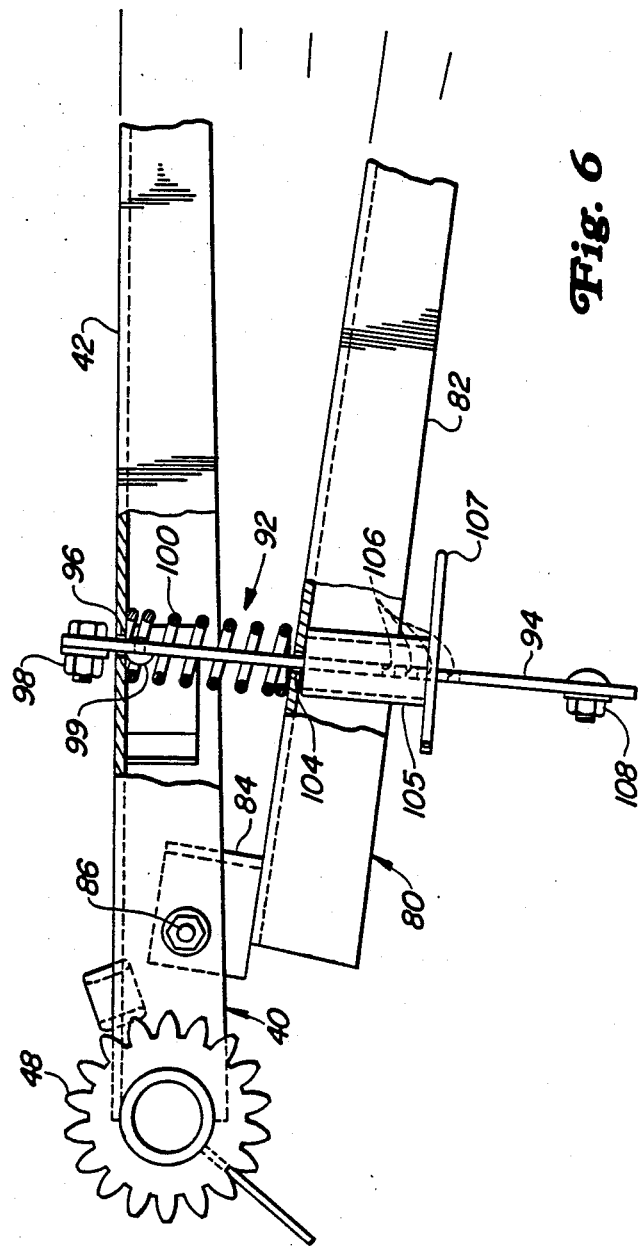
FIG. 6 is a plan view of a portion of the double twine arm assembly showing the "piggy-backed" twine arm in a middle position of adjustment and indicating other possible adjustment positions.

A second twine arm 80 is mounted to the twine arm 40 for being moved together therewith by operation of the actuator 56. Specifically, the twine arm 80 includes a channel-like section 82 having an outwardly decreasing taper and being located forwardly of the twine arm 40 and carrying a U-shaped bracket 84 adjacent its inner end. The bracket 84 is received between upper and lower flanges of the channel-like section 42 of the arm 40 and includes upper and lower legs respectively pivotally connected to the flanges by upper and lower, axially aligned, upright pivot assemblies 86 and 88. A twine-dispensing tube 90 is fixed to an outer end of the twine arm section 82 and is normally held spaced a preselected adjustable distance from the twine dispensing tube 46 of the first twine arm by a spring-loaded bar assembly 92, best shown in FIGS. 4 and 6. The bar assembly 92 comprises a strap 94 received in an opening 96 provided in the web of the channel-like section 42 of the first twine arm 40 and secured in place by a bolt assembly 98 secured in the rear end of the strap and a rivet 99 located in the strap on an opposite side of the web from the bolt assembly 98. A coil compression spring 100 is received on the strap 94 and has opposite ends respectively engaged with the respective webs of the twine arms 40 and 80. The strap 94 projects through an opening 104 provided in the web of the channel-like section 82 of the second twine arm 80 and a cylindrical spacer 105 is received on the strap and bears against an opposite side of the web from the spring. A plurality of holes 106 are provided along the length of the rod for selectively receiving a spring wire clip 107 located ahead of the spacer, as viewed in FIG. 6, for maintaining the arm 80 at a desired disposition relative to the arm 40 thereby establishing a preselected spacing between the twine dispensing ends of the arms 40 and 80 to thereby establish the spacing of twine strands applied to the circumference of a bale being wrapped with twine. A bolt assembly 108 in the forward end of the strap 94 prevents the arm 80 from accidentally coming off the strap when the clip 107 is removed.

Figure 3:
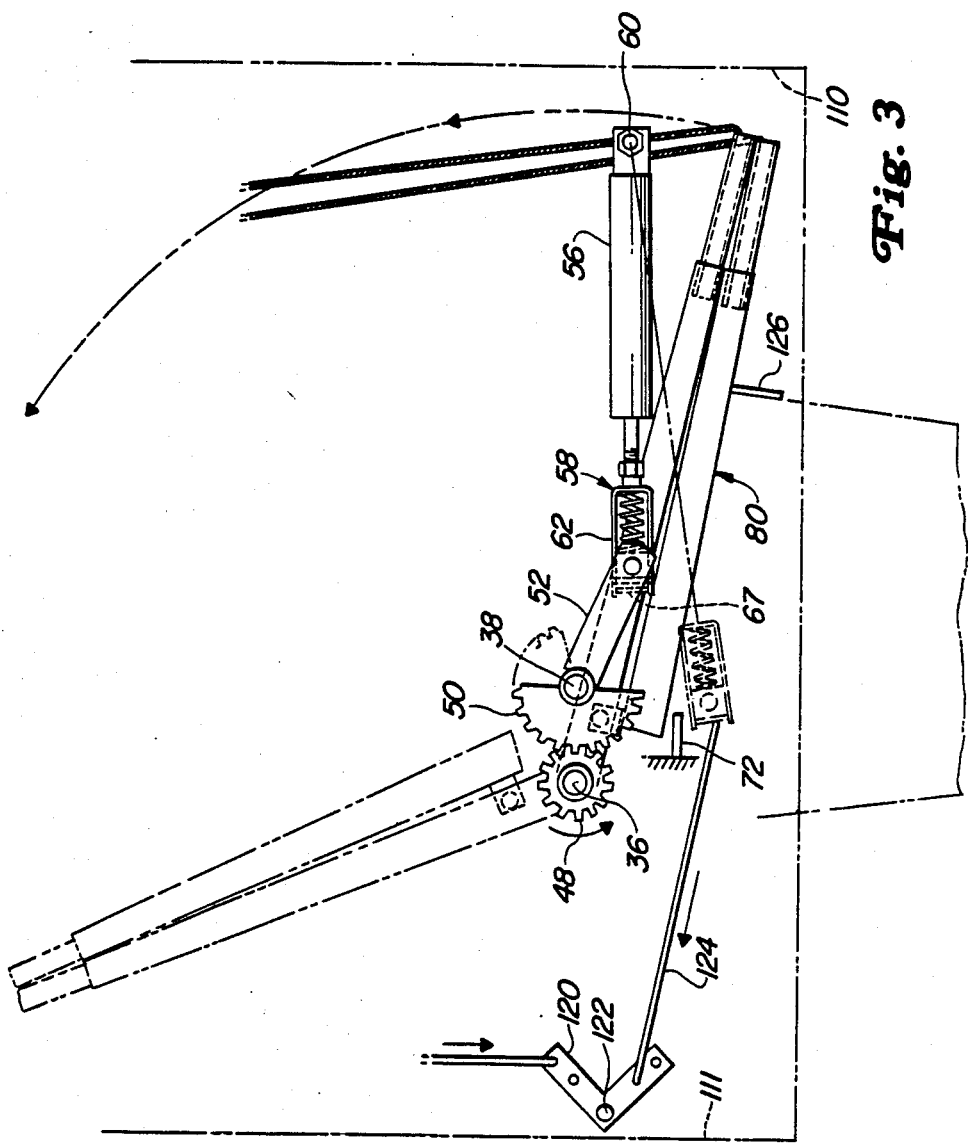
FIG. 3 is a plan view of the double twine arm assembly shown in FIG. 2 but in addition showing the reversing valve shifter rod and a dashed line second location of the double twine arm reached just prior to operation of the shifter rod.
Figure 4:
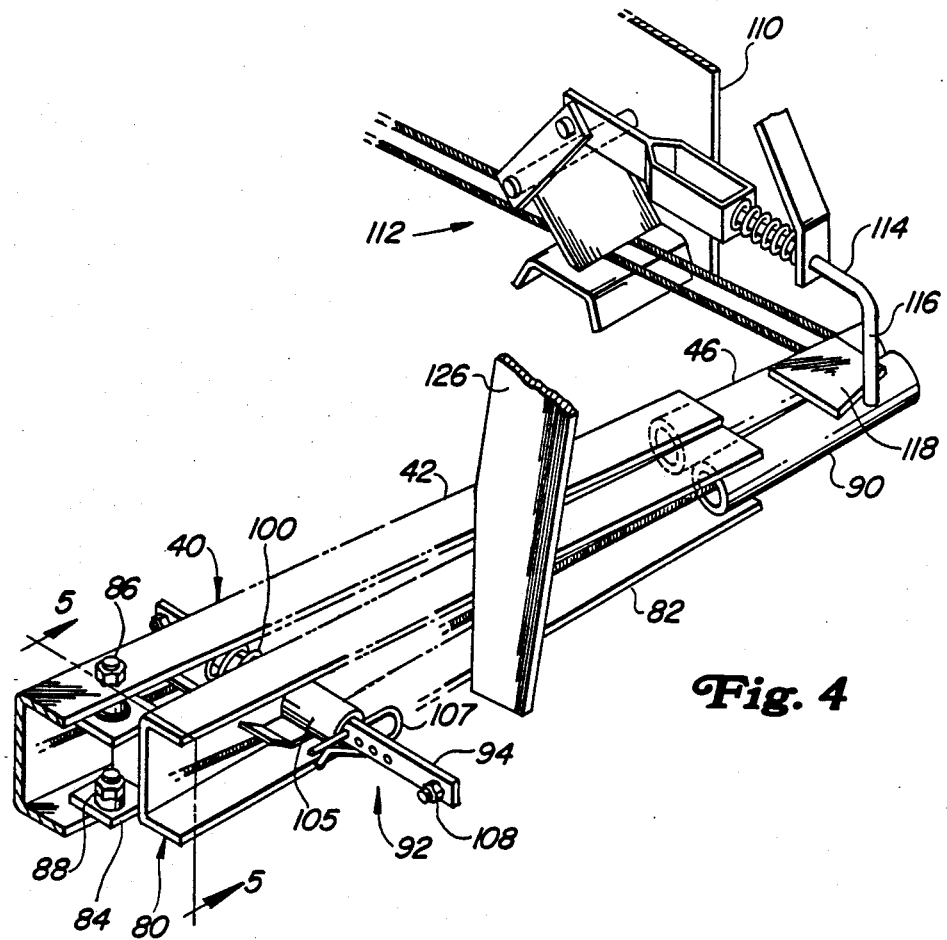
FIG. 4 is a right front perspective view showing the relative positions of the individual twine arms at the time the twine cutting knife operating lever is operated.
Figure 5:
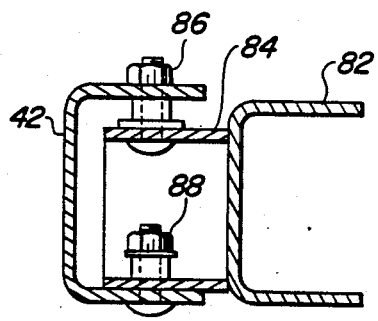
FIG. 5 is an enlarged, vertical sectional view of the double twine arm taken along line 5—5 of FIG. 4.

The twine arm 40 and the arm 80 carried thereby are movable back and forth in front of the bale forming chamber between a first location about negative fifteen degrees (here shown as the full line position of the twine arms 40 and 80 in FIG. 3 wherein the twine dispensing ends of the arms are adjacent a left-hand sidewall 110 of the bale chamber) and a second position of about 112 degrees (here shown in dashed lines in FIG. 3 wherein the twine dispensing ends are adjacent a right-hand sidewall 111 of the bale chamber).

Located adjacent the left-hand sidewall 110 (FIG. 4) is a twine cut-off mechanism 112 including a blade control rod 114 having a depending end 116 located for being engaged by an actuator plate 118, fixed to an upper, outer location of the twine dispensing tube 46, when the arm 40 returns to its first location. The structure and operation of the twine cut-off mechanism 112 is like that described in the previously identified U.S. Pat. No. 4,457,226 and for the sake of brevity is not here described in further detail.

A bell crank 120 (FIGS. 2 and 3) forming part of a reverser valve control linkage is mounted adjacent the right-hand sidewall 111 for rotation about an upright pivot pin 122. A valve shifter rod 124 has one end connected to one arm of the bell crank and has a second end located for engagement by the extendible link 58 upon further extension of the actuator 56 upon engagement of the crank arm 52 with the stop 72, such further extension causing movement of the rod 124 resulting in pivoting of the bell crank and operation of a reverser valve (not shown) coupled for actuation by movement of the crank arm 52. Such operation of the reverser valve is like that described in the aforementioned U.S. Pat. No. 4,457,226, and for the sake of brevity, is not further disclosed nor described here. Suffice it to say that the actuator 56 will be caused to retract to swing the twine dispensing arms 40 and 80 back to their first location once the reverser valve has been actuated.

A stop 126 is positioned to be engaged by the twine dispensing ar 80 as the arm approaches its first location. The spring-loaded bar assembly 92 permits the arm 40 to continue swinging once the arm 80 has engaged the stop 126, the actuator plate 118 then passing above the arm 80 and engaging the blade control rod end 116 to effect actuation of the twine cut-off blade.

In operation, the twine wrapping cycle is preferably automatically initiated, in the manner disclosed in the aforementioned U.S. Pat. No. 4,457,226, when a bale reaches a predetermined size within the bale forming chamber 10. The twine arms 40 and 80 are then in their first location with their respective twine dispensing tubes 46 and 90 disposed adjacent the left-hand sidewall 108 of the bale forming chamber 10. Initiation of the cycle results in pressure fluid being supplied for extending the hydraulic actuator 56, such extension effecting rotation of the drive and driven gears 50 and 48, respectively and in the arm 40 sweeping toward the right-hand sidewall 110, the spring load bar assembly then acting, in tension, to pull the arm 80 behind it. Once respective twine strand ends dangling from the dispensing tubes 46 and 90 are fed into the bale chamber along with crop fed by the pickup 22, twine will be pulled from respective supply rolls (not shown) and will be fed between the belts 12 and the formed bale. The operation of the pickup 22 is then discontinued with the rotating bale then acting to pull twine from the supply rolls. Wraps of twine will be spaced on the periphery of the bale in accordance with the setting of the strap 94 determined by the location of the wire clip 107 within the holes 106.

When the twine dispensing ends of the arms 40 and 80 near the right-hand sidewall 110 of the chamber 10, the crank arm 52 engages the stop 72. Continued extension of the actuator 56 is permitted by the compressible link 58, this continued extension being a dwell period in the twine arm cycle permitting additional wraps of twine to be applied to the right-hand end of the bale. The plate 67 at the end of the U-shaped member 62 of the link 58 will act during this further extension of the actuator 56 to engage and displace the reverser valve shifter rod 124 so as to effect actuation of the reverser valve (not shown) so as to reverse the flow of fluid to and from the actuator 56 to cause it to retract to return the twine arms 40 and 80 to their first location. The arm 80 will lead the arm 40 during this return and when the arm 80 reaches its beginning position it will engage the stop 126, the spring-loaded ba assembly 92 then permitting the arm 40 to continue swinging by compressing the spring 100. The actuator plate 118 carried by the arm 40 eventually passes over the arm 80 and engages and shafts the blade control rod 114 to cause actuation of cut-off blade to sever the twine strands emanating from the tubes of the arms 40 and 80. Wrapping of the bale is then completed and the bale is discharged with operating pressure then being automatically disconnected from the actuator 56 in the manner described in U.S. Pat. No. 4,457,226.

While the double twine arm assembly 30 has been described herein as being operated by hydraulically driven gears, it will be appreciated that the arm assembly would find utility with other types of drives as well. Further, while the arm 80 is here shown mounted to the arm 40, it will be appreciated that the arm 80 could be mounted to the support shaft 36 together with the arm 40 without impairing the operation of the feature of being able to adjust the spacing between the twine dispensing ends of the arms to thereby effect a desired spacing of twine wraps applied to the circumference of a bale.

I claim:

1. A baler including a baling chamber having transversely spaced first and second sides and a double twine arm assembly for dispensing twine for wrapping a large cylindrical bale located within the bale chamber, said twine arm assembly comprising: a first twine arm including a first twine dispensing end being pivotally mounted for oscillation about an axis to sweep a path between first and second locations respectively disposing the twine dispensing end thereof adjacent the first and second sides of the chamber; a second twine arm including a second twine dispensing end and being mounted for oscillating in a path at least adjacent to the path swept by the first twine arm; reversible drive means coupled to said first twine arm for oscillating the latter between said first and second locations; and connection means coupling the second arm to the first arm for concurrent movement therewith both towards and away from the second location and including adjustment means for selectively varying the distance between the twine dispensing ends of the first and second twine arms.

2. The double twine arm assembly defined in claim 1 wherein said connection means includes a pivotal connection between the first and second arms spaced from said axis whereby the first and second arms both pivot about said axis.

3. The double twine arm assembly defined in claim 1 wherein said adjustment means includes yieldable biasing means normally separating the twine dispensing ends of the first and second twine arms by a preselected distance; said second arm being located to lead said first arm when the first arm is moving from its second to its first location; stop means located adjacent said first location for stopping movement of the second arm; and said yieldable biasing means permitting the first arm to continue toward said first location after the second arm has engaged said stop means.

4. The double twine arm assembly defined in claim 3 and further including a cut-off blade trip lever located adjacent said second location and having an end located adjacent to the position occupied by the second arm when the latter is engaged with said stop means; and an actuator plate fixed to the first arm in a position for engaging the end of the trip lever when the first arm is driven toward its first location after the second arm has engaged said stop means.

5. The double twine arm assembly defined in claim 1 wherein said adjustment means includes a bar secured to one and slidably received in another of the first and second twine arms; a plurality of adjustment holes located in the bar at locations spaced along its length; a fastener located in one of the adjustment holes; and a coil compression spring located on the bar and acting to bias said another of the first and second twine arms toward said fastener.

6. The double twine arm assembly defined in claim 5 wherein said bar is secured to the first twine arm and slidably received in the second twine arm.

7. The double twine arm assembly defined in claim 5 wherein the first and second twine arms respectively, include first and second walls extending crosswise to the path swept by the arms; and said bar being secured to one and slidably mounted in the other of the first and second walls.

8. The double twine arm assembly defined in claim 7 wherein the bar is secured to the first wall and slidably received in the second wall.

9. The double twine arm assembly defined in claim 7 wherein the coil compression spring is located between the first and second walls.

10. The double twine arm assembly defined in claim 7 wherein said adjustment means includes a cylindrical spacer received on said bar and located between said other of the first and second walls and said fastener whereby the spring keeps the spacer sandwiched between the other of the first and second walls and the fastener.

* * * * *